United States Patent [19]

Boring

[11] 4,415,297
[45] Nov. 15, 1983

[54] VACUUM MATERIAL TRANSPORTING SYSTEM

[75] Inventor: Douglas J. Boring, Franklin, Pa.

[73] Assignee: Conair, Inc., Franklin, Pa.

[21] Appl. No.: 38,391

[22] Filed: May 14, 1979

[51] Int. Cl.³ .............................................. B65G 53/60
[52] U.S. Cl. ...................................... 406/168; 55/315; 55/338
[58] Field of Search ............... 406/29, 120, 168, 170, 406/171, 172, 173, 31, 32; 55/315, 337, 338

[56] References Cited

U.S. PATENT DOCUMENTS

| | | | |
|---|---|---|---|
| 2,276,805 | 3/1942 | Tolman | 406/172 |
| 3,236,565 | 2/1966 | Kester et al. | 406/171 X |
| 3,710,558 | 1/1973 | Feder | 55/338 |
| 3,874,860 | 4/1975 | Larsson | 406/168 X |
| 3,895,929 | 7/1975 | Jysky et al. | 55/337 X |
| 3,992,177 | 11/1976 | Welteroth | 55/337 X |
| 4,061,401 | 12/1977 | Brown | 406/31 X |
| 4,118,207 | 10/1978 | Wilhelm | 55/338 |
| 4,159,151 | 6/1979 | Wood | 406/173 |

Primary Examiner—Jeffrey V. Nase

[57] ABSTRACT

A vacuum material transporting system and more particularly, a vacuum material transporting system having an improved dust collecting means for collecting lightweight fines which are carried over from the main material stream.

7 Claims, 4 Drawing Figures

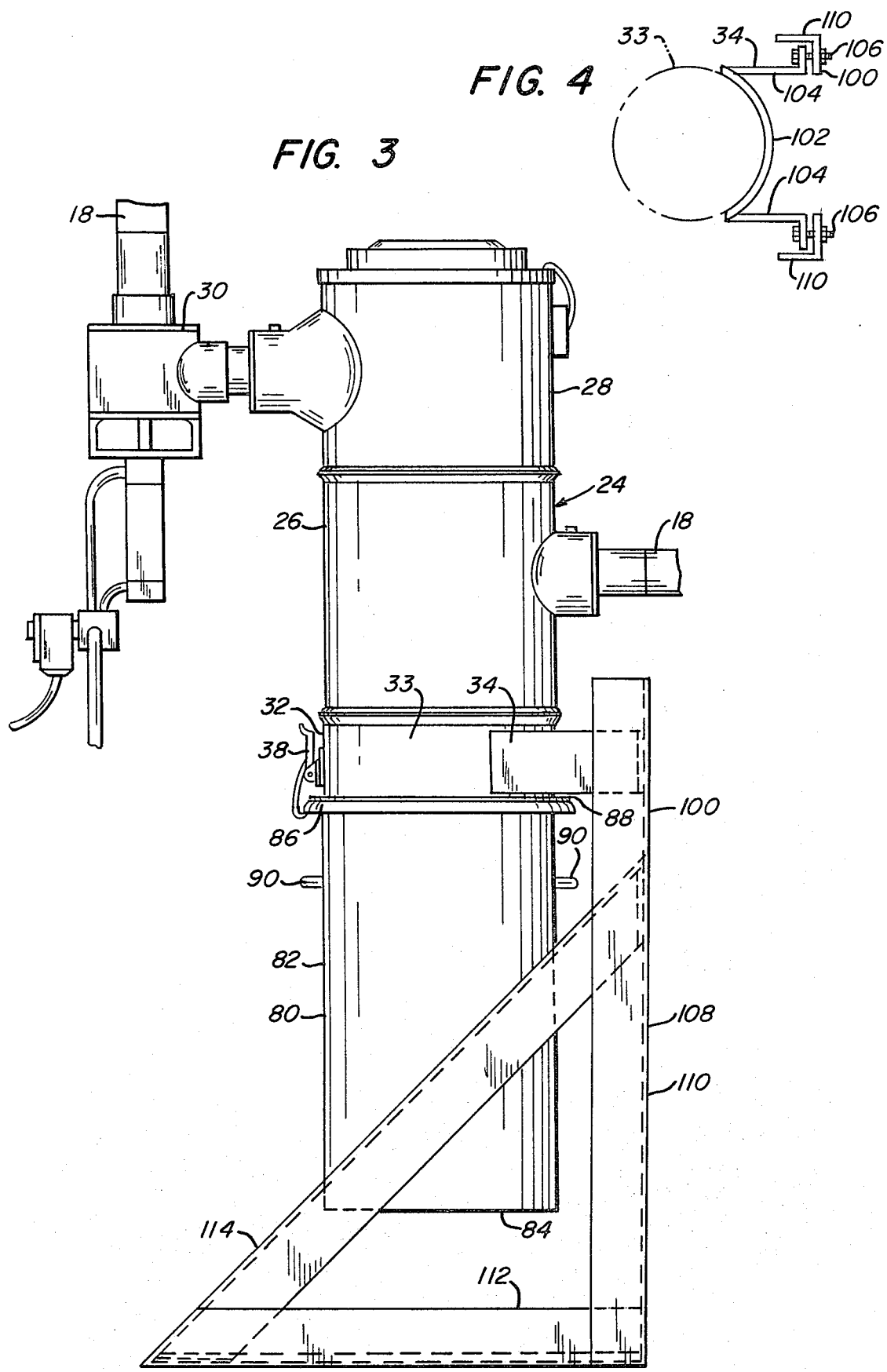

VACUUM MATERIAL TRANSPORTING SYSTEM

In many industries, such as the plastics industry, it is common practice to transport finely divided, granular or pulverant material from one or more storage bins, through one or more feedlines, having a free end embedded in or otherwise in communication with the respective materials to be transported, to a material receiving hopper of a loader by creating a vacuum in the loader. The resultant airflow occurring due to the vacuum is through the material and the one or more feedlines entrains the material in the airstream flowing to the receiving loader. The airstream carrying the material entrained therein enters the loader and the entrained material is deposited in the loader material receiving hopper while the air is withdrawn from the loader by the vacuum pump. After the receiving hopper has been loaded and the vacuum discontinued the material deposited therein is subsequently discharged into a material receiving compartment of any suitable apparatus, for example a material processor.

In material transporting systems such as the type described above, large amounts of lightweight fines frequently exist in the material being transported. When these fines reach the loader a portion will not follow the normal material flow path to the receiving hopper of the loader because of the light weight thereof and would tend to remain in the air withdrawn from the loader by the vacuum pump. Should the fines flow from the loader through the exit conduits to the vacuum pump, substantial operating problems, such as poor pump performance may result. Furthermore, if the fines actually flow into the vacuum pump, a high probability of pump damage will result.

To alleviate the above described problems due to lightweight fines, many modern primary receiving hoppers utilized a cyclonic separation arrangement within the receiving hoppers in combination with a filter media such as a flat cloth disc filter, a cartridge filter, cloth bag filter or a metal screen filter adjacent the vacuum connection to the receiving hopper to prevent a substantial portion of the continuously entrained fines in the airstream from flowing to the vacuum pump. Furthermore a recent advance in such transporting systems, as is illustrated in U.S. Patent application Ser. No. 930,715, filed Aug. 3, 1978 now U.S. Pat. No. 4,200,415 and assigned to the same assignee as is this invention, provides an even more significant cyclonic type separation which, in many instances, alleviates the necessity of a filter adjacent the vacuum connection to the receiving hopper. Nevertheless in all instances of such transporting systems, the systems necessarily included a passive filter, such as a cloth disc filter or metal screen, which was disposed in the vacuum line adjacent the vacuum pump.

With the utilization of passive filters such as described adjacent the loaders and/or vacuum pump, certain inherent problems result, for example:

1. Reduced material flow rate due to gradually increasing pressure drops across the filters as they become increasingly clogged with fines.
2. Rough material flow, surging and line plugging due to dirty filters which interfere with air flow.
3. Substantial maintenance problems and expense necessitated by frequent requirements of filter cleaning or replacement. In this regard, it is noted that with a typical plastics transporting device which transports five hundred pounds of pulverant per hour, it is not unusual to require filter maintenance every eight hours.
4. Damaged vacuum pumps caused by incorrectly installed or missing filters.
5. In those systems which include filters adjacent the loader-vacuum line connection, increased maintenance risk resulting from the primary filter location. In these instances, because of the large amount of fines which are separated from the normal material flow, the primary filter often is located within the primary material receiver, eight to twelve feet above the floor level. Thus, maintenance persons must climb to this upper location in order to change or clean the filter.

The present invention includes a vacuum material transporting system having a cyclonic dust collecting device disposed in the vacuum line intermediate the loaders and the vacuum pump. The dust collection device is located at ground level and further includes means for selectively unloading the collected fines without significantly interrupting the operating cycle of the transportation system. Furthermore, the dust collecting device of this invention includes means for automatically recycling the collected fines to the primary feed line of the pneumatic transportation system. Thus, the present invention greatly alleviates the above mentioned problems inherent with prior vacuum material transporting systems. Specifically, because of the significant degree of downstream removal of entrained lightweight fines from the flowing airstream, coupled with the selected unloading of the collected fines without affecting the operating cycle of the transportation system: maintenance of the final filter adjacent the vacuum pump is substantially reduced; filters at the loader vacuum line juncture can be dispensed with in many instances, particularly if the efficient separation arrangement of U.S. Patent application Ser. No. 930,715, now U.S. Pat. No. 4,200,415, is utilized; material waste, downtime and manpower requirements will be reduced substantially; and generally a more efficient and smooth material flow and operation of the vacuum pump will result.

Accordingly, it is one object of this invention to provide a new and improved material transporting system for granular or pulverant material having improved dust collecting means for separating the lightweight fines associated with the transported materials at a location downstream from the loaders and thereafter selectively discharging the fines from the dust collecting means without substantially affecting the operating cycle of the transporting system.

Another object of this invention is to provide a vacuum material transporting system wherein the dust collecting means is located adjacent a floor level location.

A still further object of this invention is to provide a vacuum material transporting system having improved dust collecting means which selectively reintroduces collected fines to the main material flow.

These and other objects of this invention will become more readily apparent upon a reading of the following description and drawings in which:

FIG. 3 is a partial sectional and partial schematic view of the dust collecting means of FIG. 2 with a manual or semi-automatic unloading fixture thereon rather than the automatic unload and reload fixture illustrated in FIG. 2 and which also includes a floor stand assembly for supporting the dust collecting means.

FIG. 4 is a schematic plan view further illustrating the floor stand assembly shown in FIG. 3.

FIG. 1 is a schematic representation of a material transporting system 10 constructed in accordance with the principles of the present invention and of the type utilized in the vacuum transportation of finely divided, granular or pulverant material and, as illustrated, is for use in the plastics processing industry.

Figure 1:
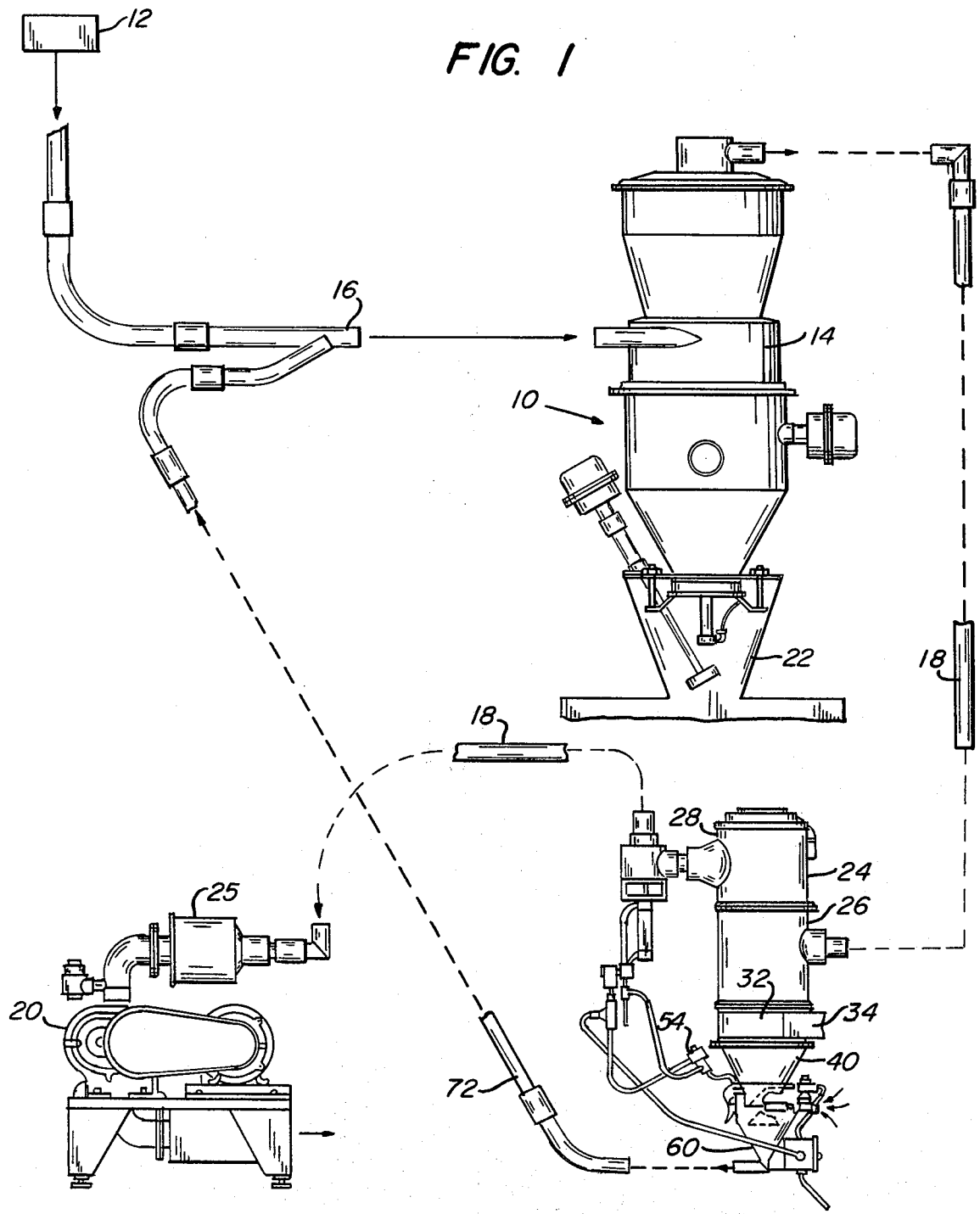
FIG. 1 is a schematic representation of a vacuum material transporting system which utilizes a dust collecting means and method of the present invention.

System 10 comprises: an upstream material source 12; one or a plurality of material loader assemblies 14 which are located downstream of the source 12 (only one assembly 14 being shown); and a primary material transporting conduit 16 which communicates between the source 12 and the material receiver 14. A suitable vacuum pump 20 communicates with loader assembly 14 by means of conduit 18 to provide the necessary suction to create an airflow to transport material to be processed from the source 12 through the conduit 16 to the loader assemblies 14. In the transporting system 10 of FIG. 1, the material which is transported to loader assemblies 14 is then discharged therefrom for subsequent processing or storage, such as into plastic processing machines 22 or into a suitable storage hopper (not shown).

The system 10 of the present invention additionally includes a dust collecting means 24 which is positioned adjacent a ground level elevation and which is in communication with suction conduit 18 at a location downstream of the loader assemblies 14 and upstream of the vacuum pump 20. Dust collecting means 24 is included in system 10 for separating a substantial portion of the dust or lightweight fines which may be carried by the airstream exiting from loader assemblies 14. This separation is accomplished by means 24 in any suitable manner, such as by cyclonic action, and means 24 includes provisions for the accumulation and the selective or automatic discharge of the accumulated fines without substantially affecting the operating cycle of the sytem 10. If desired, a ground level final filter 25 may be disposed within suction conduit 18 intermediate the dust collecting means 24 and the vacuum pump 20 to assure that any small amount of lightweight fines which are not collected by means 24 do not reach the vacuum pump 20.

Inasmuch as the invention herein is primarily in the utilization and location of dust collecting means 24 in a transporting system such as system 10 and further, that the general operation and configuration of vacuum transporting systems and their respective component parts are well known in the art, a detailed description of such well known operation and components of system 10 are not necessary to one skilled in the art for a full understanding of the invention herein. For example: a general description of vacuum conveying appears in U.S. Patent application Ser. No. 971,344, filed Dec. 20, 1978 and assigned to the same assignee as is this invention; a specific description of a material loader assembly, such as assembly 14, appears in U.S. Patent application Ser. No. 930,715, now U.S. Pat. No. 4,200,415, filed Aug. 3, 1978 and assigned to the same assignee as in this invention; and descriptions of the loader discharge valve assemblies appear in U.S. Pat. Nos. 3,273,943 and 3,635,377.

Figure 2:
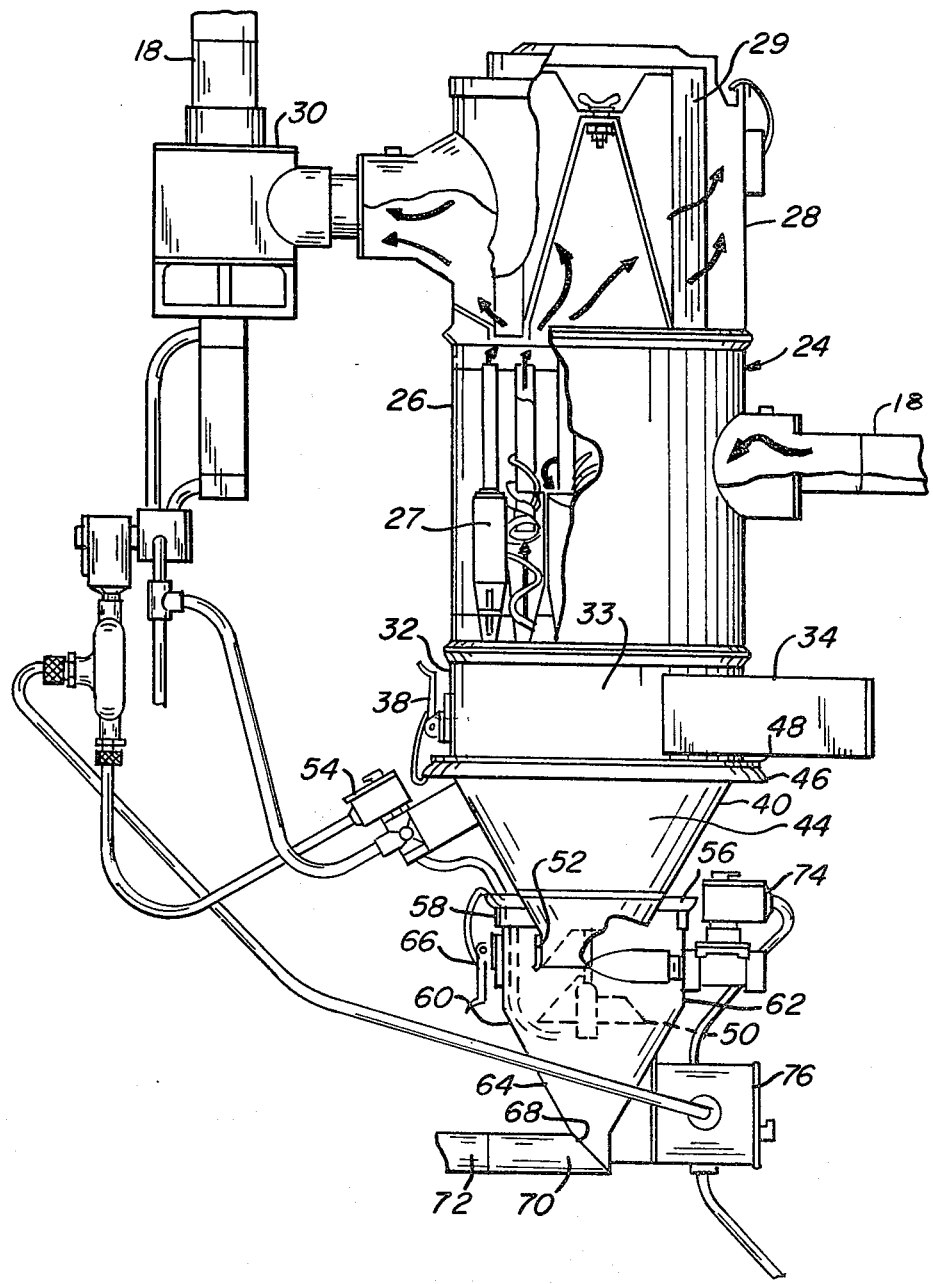
FIG. 2 is a partial sectional and partial schematic view of the dust collecting means of a vacuum material transporting system of the present invention as such dust collecting means is assembled in an automatic unload-reload mode of operation.

Dust collector means 24 is shown in the drawings with a plurality of selectively interchangeable operating components. In particular, and as will be described in detail hereinafter: the arrangement of dust collector means 24 in FIGS. 1 and 2 provides for an automatic recycling of collected lightweight fines to the primary material transporting conduit 16; and the arrangement of means 24 as illustrated in FIG. 3 provides for a manual or semiautomatic unloading of the collected fines.

Dust collector means 24 is of any suitable construction so long as it meets the following criteria:

1. Provides a substantial separation of carry-over ligtweight fines from the flow of air passing therethrough;

2. Does not provide a significant resistance to the air flow through suction conduit 18 from the material loader assemblies 14 to the vacuum pump 20;

3. May be readily emptied of accumulated fines without a substantial effect on the operating cycle of the system 10; and 4. Provides a large area for accumulating fines or, in the alternative, includes means for automatically or sequentially discharging the accumulated fines to an exterior location.

As shown in FIG. 2, dust collecting means 24 includes a separating portion 26 in communication with suction conduit 18. Suction air which includes lightweight fines suspended therein enters separating portion 26 from conduit 18 whereupon it will be subjected to suitable cyclonic and/or tortuous flow through a plurality of cyclone tubes 27 which results in a significant portion of the suspended fines being separated from the air flow. The general area where conduit 18 communicates with separating portion 26 for the removal of the significant portion of the suspended fines from the air flow may generally be referred to as the area or zone of cooperation of separation. The "cleansed" airflow then enters a filter portion 28 of collecting means 24 which is located upwardly adjacent portion 26. Suitable filter media, such as a filter cartridge 29, is included within filter portion 28 to filter out any small amount of suspended fines which may have carried over from separating portion 26. The clean suction air then flows from filter portion 28 back into the downstream spaced portion of conduit 18 and therefrom to the vacuum pump 20. If desired, a suitable popper type valve 30 may be positioned on portion 28 adjacent the connection of conduit 18 thereto to sequentially provide a sudden pressure differential to dislodge accumulated fines from the filter cartridge 29 within portion 28. Final filter 25 is displosed in conduit 18 intermediate collecting means 24 and vacuum pump 20 to provide a still further safeguard to prevent lightweight dust from entering pump 20. It is anticipated that the amount of dust carried over to final filter 25 will be insignificant, thus final filter 25 will only be rarely replaced or cleaned.

Dust collecting means 24 additionally includes a support and transition portion 32 downwardly adjacent separating portion 26. Portion 32 includes: a hollow generally cylindrical main body section 33 which sealingly supports portion 26 adjacent the upper end thereof; and a support assembly 34 which extends around a portion of body section 33 and is cooperable with a floor support 100 for the releasable support of dust collecting means 24 in a manner as will be described in detail hereinafter.

A plurality (only one being shown) of circumferentially spaced over-the-center latch assemblies 38 are carried by main body section 33 adjacent the lower end thereof. As is illustrated in the drawings, latch assemblies 38 are operable to selectively support a product receiver assembly 40 for the automatic or semiautomatic discharge of collected fines from dust collecting means 24, or a product receiving canister 80 (FIG. 3) for the accumulation and subsequent manual removal of fines separated from the flowing airstream by dust collecting means 24.

Referring to FIGS. 1 and 2, dust collecting means 24 supports the product receiver assembly 40 adjacent the lower end of main body section 33 by means of latch assemblies 38. Product receiver assembly 40 comprises a hollow inverted generally frusto conical body portion 44 having a circumferentially and radially outwardly extending flange 46 adjacent the upper end thereof. Flange 46 includes a circumferentially and upwardly extending lip portion 48 adjacent the outer periphery thereof which is structured in such a manner to cooperate with the adjacent lower periphery of body section 33, in conjunction with flange 46, to provide a peripheral sealing area between section 33 and body portion 44 when latch assemblies 38 support the product receiver assembly 40. A conical valve assembly 50 is provided adjacent the lower discharge opening 52 of body portion 44. Valve assembly 50 is selectively actuatable, such as by an air operable valve schematically shown at 54, to close off and uncover opening 52 to control the discharge of accumulated fines therefrom. Inasmuch as the specific configuration and operation of discharge valve assembly 50 is generally well known in the art and has been previously shown and described in various prior art patents, such as U.S. Pat. Nos. 3,273,943 and 3,635,377, further description thereof is not necessary for an understanding of this invention by one skilled in the art.

Product receiver assembly 40 additionally includes a radially outwardly extending flange 56 upwardly adjacent the lower end thereof. Flange 56 includes a circumferentially and downwardly extending lip portion 58 adjacent the outer periphery thereof which is structured in such a manner to cooperate with adjacent portions of an automatic reloader assembly 60, in conjunction with flange 56, to provide a peripheral sealing area between receiver assembly 40 and loader assembly 60 when the assembly 60 is supported by assembly 40.

Reloader assembly 60 comprises an upper cylindrical body portion 62 and an inverted generally frusto conical lower body portion 64 which extends coaxially downwardly from portion 62. Portion 62 includes a plurality (only one being shown) of circumferentially spaced upwardly extending over-the-center latch assemblies 66 adjacent the upper end thereof which are operable to cooperate with flange 56 for the selective support of reloader assembly 60 by the product receiver assembly 40. The lower discharge opening 68 of body portion 64 is in open communication with a transition stub conduit 70. Stub conduit 70 communicates at one end thereof with a reloading conduit 72 which, as shown, communicates between conduit 70 and an upstream portion of the primary material transporting conduit 16. The end of stub conduit 70 which is in communication with lower discharge opening 68 is normally closed to atmosphere and is selectively opened to atmosphere by any suitable valve means, for example an electrically energizable valve which is schematically illustrated in FIG. 2 at 74. A suitable control, such as is schematically shown at control box 76, is provided for the selective control of valve 74. As shown valve 74 is carried by reloader assembly 60 adjacent body portion 62 and when it is opened to atmosphere, the interior periphery of assembly 60, including stub conduit 70, will be open to atmosphere.

With a configuration as described above and with the understanding that suitable means are provided for electrical signaling and resultant operations throughout the material transporting system 10, one sequence of operation of one cycle of a system 10 of this invention when an automatic accumulation of fines and sequential automatic recirculation thereof by the dust collecting means 24 is desired, is as follows:

1. Vacuum pump 20 is energized for a first time period to cause material to be processed to flow through the primary material transporting conduit 16 to load the material loader assemblies 14 for the subsequent sequential discharge therefrom to the processing machines 22.

2. During the first time period the conical valve assembly 50 is energized to close off the lower discharge opening 52 thus providing that the lightweight fines separated from the suction airstream flowing through dust collecting means 24 will be accumulated within product receiver assembly 40.

3. During a first portion of the first time period, the valve 74 is energized to open stub conduit 70 to atmosphere, for example a total of 5–10 sec. This will result in the accumulated lightweight fines which have been previously discharged from receiver assembly 40 to the reloader assembly 60 being drawn therefrom by suction through stub conduit 70, through the reloading conduit 72 and recirculated with the main material flow at the juncture of reloading conduit 72 with the primary material transporting concuit 16.

4. Vacuum pump 20 is de-energized for a second time period thereby resulting in a cessation of flow of material to be processed through the primary material conduit 16.

5. During the second time period the conical valve assembly is also de-energized thus resulting in lower discharge opening 52 being open to reloader assembly 60 and the lightweight fines which have accumulated within receiver assembly 40 will flow by gravity into assembly 60.

6. During a second portion of the first time period and continuing during the second time period, the valve 74 is de-energized thus resulting in stub conduit 70 being closed to atmosphere.

It is understood that items 1 thru 6 above define one complete preferred cycle of a dust collecting means which includes a product receiver assembly 40 and an automatic reloader assembly 60 and which separates lightweight fines from the flowing airstream at a ground level location and thereafter automatically reintroduces the separated fines to the main material stream. It is to be further understood that, depending upon conditions and/or equipment capacity, variations to the cycle described may be equally acceptable or preferred. For example one such variable cycle would be identical to items 1 thru 6 described above with the exception that the sequencing of items 2 and 5 would be modified somewhat such that valve assembly 50 would close off opening 52 only during the first portion of the first time period. In this alternative cycle, valve assembly 50 would be de-energized at the beginning of the second portion of the first time period such that receiver assembly 40 will be in open communication with reloader 60 during the second portion of the first time period as well as during the second time period.

A still further variance to an automatic load and unload sequence described in items 1 through 6 discussed above would be to have conical value 50 energized to close off the lower discharge opening 52 only during a middle portion of every other first time period. In the first and last portions of such a first time period as well as during the intermittent first time period and the adjacent second time periods the conical valve 50 would be de-energized thus opening discharge opening 52 into communication with reloader assembly 60. In such an alternative sequence, the sequencing of valve 74 will be identical that of valve 50 to provide that when opening 52 is covered, energization of valve 74 will cause stub conduit 70 to be open to atmosphere. This latter variance will result in a longer length of time for separated lightweight fines to accumulate within the product receiver assembly 40 and a significantly shorter time period of operative communication between reloader assembly 60 and the primary material transporting conduit 16. Thus the variance described in this paragraph would more likely be desirable in those instances when the upstream separation of lightweight fines is relatively efficient (i.e. when using material loader assemblies 14 such as are described in U.S. Patent application Ser. No. 930,715, now U.S. Pat. No. 4,200,415, filed Aug. 3, 1978). If such an efficient upstream separator was not utilized the brief communication of reloader assembly 60 with conduit 16 may result in an undesirable material surge.

It is to be noted that dust collecting means 24 may also be utilized in a "semi-automatic" mode. In this variation only the product receiver assembly 40 would be supported by dust collecting means 24. A reloader assembly 60 fixture would not be included. Opening 52 of assembly 40 can be arranged to selectively communicate with any suitable material repository, for example a bin (not shown). In such an alternative arrangement conical valve assembly 50 could be sequenced in any desired manner; for example, a timing arrangement, an electrical interlock arrangement, or through energization from a signal resulting from a sensed material level within receiver assembly 40.

FIG. 3 illustrates a manual unloading mode of the dust collecting means 24. In this embodiment dust collecting support and transition portion 32 supports a product receiving cannister 80 adjacent the lower end of main body section 33 by means of the latch assemblies 38. Product receiving cannister 80 comprises a hollow generally cylindrical main body portion 82 having a lower transversely extending end wall 84 and a circumferentially and radially outwardly extending flange 86 adjacent the upper end thereof. Flange 86 includes a circumferentially and upwardly extending flange 88 adjacent the outer periphery thereof which is structured in such a manner to cooperate with the adjacent lower periphery of body section 33 to provide a peripheral sealing area between section 33 and body portion 82 when latch assemblies 38 support the product receiving cannister 80. Body portion 82 additionally includes a diametrically opposed pair of handles 90 thereon to facilitate in the handling of cannister 80 when it is being manually emptied.

With the arrangement illustrated in FIG. 3, the dust collecting means 24 automatically separates the lightweight fines from the flowing airstream and such separated fines drop by gravity into cannister 80 which provides a large volume to hold the accumulated fines. When it is desired to empty cannister 80, latch assemblies 38 are easily released.

FIGS. 3 and 4 additionally illustrate the cooperation of support assembly 34 and floor support 100 in supporting the dust collecting means 24 upwardly adjacent a ground level elevation. As shown support assembly 34 comprises: an arcuate portion 102 rigidly secured, such as by welding, to an adjacent peripheral portion of section 32; and a pair of arcuately spaced angle portions 104 having the long legs secured to respective arcuate ends of portion 102 and extending outwardly therefrom. With such an arrangement the free legs of angle portions may be releasably secured, such as by bolts 106 or the like, to a wall bracket or as shown are releasably secured to floor support 100.

Floor support 100 includes a pair of transversely spaced generally "L" shaped weldments 108 wherein the vertically extending angle leg 110 has a respective free leg of an adjacent angle portion 104 releasably secured thereto and the horizontally extending angle leg 112 engages the ground surface downwardly adjacent the dust collecting means 24. A knee brace 114 extends at an angle between legs 110 and 112 and, if desired, struts (not shown) which extend transversely between weldments 108 may be included to unitize and add rigidity to support 100.

The embodiments described herein are the presently preferred embodiments of a vacuum material transporting system 10 of the present invention; however, it is understood that various modifications may be made to the embodiments described herein by those skilled in the art without departing from the scope of the invention as is defined by the claims set forth hereinafter. For example the sequencing of operation of the system 10 may be altered to suit conditions of operation as well as various types of material being transported; means to sense the quantity of accumulated lightweight fines within receiver assembly 40 may be included; support arrangements, other than assembly 34 and floor support 100 are contemplated; and the like.

I claim:

1. In a particulate material conveying system wherein particulate material is conveyed from a source of such particulate material for spaced periods of time with respect to selected particulate receiving means of a plurality of particulate receiving means by entraining the particulate material in an airstream created by a selectively actuatable vacuum pump connected to the downstream end of a vacuum line cooperable with such a source and each of said particulate receiving means and during which periods lightweight fines of the particulate material flow through the vacuum line, the improvement comprising: continuously removing, during each period said particulate material is being conveyed, such lightweight fines from the section of said vacuum line extending between said vacuum pump and of the one of said particulate receiving means closest to said vacuum pump in terms of said particulate material flow while simultaneously accumulating the removed lightweight fines at a first location subject to the vacuum in said vacuum line; discontinuing the vacuum in said vacuum line at the end of each period particulate material is being conveyed; discharging said accumulated light-weight fines from said first location to a second location in material flow communication with said first location only during periods said vacuum in said vacuum line is discontinued and retaining such discharged lightweight fines at said second location, and subsequently recirculating said lightweight fines retained at said second location to said vacuum line when a vacuum exists therein.

2. In a particulate conveying system as set forth in claim 1 wherein said first location is located above said second location and said discharging is by gravity.

3. In a particulate conveying system as set forth in cmaim 1 wherein said second location is at an elevation below the elevation of at least some of said particulate receiving means.

4. In a particulate conveying system as set forth in claim 1 wherein said second location is at an elevation below the elevation of all of said particulate receiving means.

5. In a particulate conveying system as set forth in claim 1 wherein said recirculation to said vacuum line is in a section of said vacuum line communicating directly with such a source of particulate material.

6. In a particulate conveying system as set forth in claim 1 wherein said recirculation is by inducing a vacuum in said second location.

7. In a particulate conveying system as set forth in claim 1 wherein said recirculation is by inducing a vacuum in said second location and supplying such recirculated lightweight fines to a section of said vacuum line communicating directly with such a source of particulate material.

* * * * *